US012627143B2

(12) United States Patent
Xu et al.

(10) Patent No.: US 12,627,143 B2
(45) Date of Patent: May 12, 2026

(54) CONTROL METHOD FOR SUPPRESSING OVERVOLTAGE

(71) Applicant: ZHEJIANG UNIVERSITY, Hangzhou (CN)

(72) Inventors: Zheng Xu, Hangzhou (CN); Nan Zhang, Hangzhou (CN); Zheren Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 182 days.

(21) Appl. No.: 18/688,675

(22) PCT Filed: Jul. 26, 2022

(86) PCT No.: PCT/CN2022/107809
§ 371 (c)(1),
(2) Date: Mar. 1, 2024

(87) PCT Pub. No.: WO2023/029813
PCT Pub. Date: Mar. 9, 2023

(65) Prior Publication Data
US 2025/0118963 A1 Apr. 10, 2025

(30) Foreign Application Priority Data

Sep. 1, 2021 (CN) .......................... 202111023962.5

(51) Int. Cl.
| | |
|---|---|
| *H02J 3/001* | (2026.01) |
| *H02H 7/22* | (2006.01) |
| *H02J 3/36* | (2026.01) |

(52) U.S. Cl.
CPC ........... *H02J 3/00125* (2020.01); *H02H 7/22* (2013.01); *H02J 3/36* (2013.01)

(58) Field of Classification Search
CPC .......... H02J 3/00125; H02J 3/36; H02H 7/22; H02H 9/04; Y02E 60/60; H02M 1/32; H02M 7/483
(Continued)

(56) References Cited

U.S. PATENT DOCUMENTS

2018/0120367 A1* 5/2018 Lewis .................. H02H 1/0007

FOREIGN PATENT DOCUMENTS

| | | | |
|---|---|---|---|
| CN | 103701145 A | * | 4/2014 |
| CN | 105406499 A | | 3/2016 |

(Continued)

OTHER PUBLICATIONS

Zheng et al., "Inverter Station Connection Modes and Control Strategies of LCC-MMC Hybrid HVDC Systems" 2018.
(Continued)

*Primary Examiner* — Sreeya Sreevatsa
(74) *Attorney, Agent, or Firm* — Maschoff Brennan

(57) ABSTRACT

A control method for suppressing an overvoltage of the receiving end hybrid modular multilevel converter with full-bridge submodules and half-bridge submodules (F/HMMC) under the fault at the receiving-end alternating-current (AC) system of the hybrid high-voltage direct-current (HVDC) transmission system. After a short-circuit fault occurs in a receiving-end AC) system of the hybrid HVDC transmission system, an AC voltage drop is generated, and the effective voltage of the receiving-end AC bus at the current time is measured. Because the hybrid modular multilevel converter (MMC) is capable of actively decreasing the DC voltage for operation, on a premise of ensuring that its output current is always within a rated current range, a control manner of setting the reference DC voltage and making the reference DC voltage not greater than the effective voltage of the AC bus enables receiving end power
(Continued)

to be sent out, thereby suppressing an overvoltage of the receiving-end F/HMMC.

8 Claims, 9 Drawing Sheets

(58) Field of Classification Search
     USPC ......................................................... 361/91.1
     See application file for complete search history.

(56) References Cited

FOREIGN PATENT DOCUMENTS

| | | | | |
|---|---|---|---|---|
| CN | 105896585 | A | | 8/2016 |
| CN | 110174585 | A | * 8/2019 | ............. G01R 31/50 |
| CN | 105406501 | B | * 7/2020 | ................ H02J 3/36 |
| CN | 113629708 | A | | 11/2021 |

OTHER PUBLICATIONS

Yuzhe et al. "Control Strategy for Hybrid HVDC Transmission System Based on LCC and Hybrid MMC" Aug. 2018.
Te et al., "Engineering Technology of Multi-terminal Hybrid Flexible UHVDC Transmission" Dec. 2021.

* cited by examiner

CONTROL METHOD FOR SUPPRESSING OVERVOLTAGE

CROSS REFERENCE TO RELATED APPLICATION

This application is a national stage application of International Patent Application No. PCT/CN2022/107809, filed on Jul. 26, 2022, which claims priority to the Chinese Patent Application No. 202111023962.5, filed with the China National Intellectual Property Administration (CNIPA) on Sep. 1, 2021, and entitled "CONTROL METHOD FOR SUPPRESSING OVERVOLTAGE UNDER FAULT AT RECEIVING-END ALTERNATING-CURRENT (AC) SYSTEM OF HYBRID HIGH-VOLTAGE DIRECT-CURRENT (HVDC) TRANSMISSION SYSTEM", which is incorporated herein by reference in its entirety.

TECHNICAL FIELD

The present disclosure relates to the technical field of a power system, and specifically, to a control method for suppressing an overvoltage under a fault at a receiving-end alternating-current (AC) system of a hybrid high-voltage direct-current (HVDC) transmission system.

BACKGROUND

At present, most existing HVDC transmission projects use a conventional HVDC transmission technology based on a line commuted converter (LCC) of a power grid. The conventional HVDC transmission technology has advantages such as a low cost, a low loss, and high technological maturity. However, there are also drawbacks such as an easy commutation failure on an inverter side and an inability to transmit power to a weak AC system or a passive system. A flexible HVDC transmission technology based on a modular multilevel converter (MMC) has received widespread attention from academia and industry in recent years. Compared with the conventional HVDC transmission technology, the flexible HVDC transmission technology based on the MMC has advantages such as no risk of a commutation failure, an ability to supply power to a passive power grid, independent control for active and reactive power, and a low harmonic level. However, the flexible HVDC transmission technology based on the MMC also has disadvantages such as a high operating loss and a high investment cost.

In order to fully leverage advantages of the LCC and the MMC in the power grid, a hybrid HVDC transmission system based on the LCC and the MMC has recently received increasing attention from various sectors. The hybrid HVDC transmission system based on the LCC and the MMC effectively expands the application scope of the HVDC transmission system and will inevitably become a development direction for future large-scale, long-distance, and large-capacity power transmission. An LCC-F/HMMC hybrid HVDC transmission system can leverage its advantages of a low loss and high technological maturity by using the LCC at a sending end. At a receiving end, the hybrid MMC (namely, an F/HMMC) with full-bridge submodules (FBSMs) and half-bridge submodules (HBSMs) is adopted to not only avoid the commutation failure on the inverter side, but also exert DC fault self-clearing capability of the FBSM. Because each bridge arm of the F/HMMC is formed through hybrid cascading of the HBSM and the FBSM, the number of power electronic devices used and the operational loss can be reduced, which is beneficial for engineering.

A short-circuit fault in a receiving-end AC system of the hybrid HVDC transmission system blocks energy transmission. However, it is usually difficult for the sending end to make a quick response in a short period of time, resulting in a temporary power surplus of the receiving-end system and generating an overvoltage on receiving-end converters. Therefore, after a fault at the receiving-end AC system, the receiving end needs to actively decrease the DC voltage to reduce energy absorption, ensure that power can be sent out, avoid the overvoltage for the receiving-end converters, and improve the operational reliability of the hybrid HVDC transmission system.

The literature [Xu Yuzhe, Xu Zheng, Zhang Zheren, et al. Control Strategy for Hybrid DC Transmission System Based on LCC and Hybrid MMC [J]. Guangdong Electric Power, 2018, 31 (9): 13-25] analyzes an operating principle of the hybrid MMC and a relationship between an operating range of the DC voltage of the receiving-end converter and the submodule ratio. It studies a self-clearing problem of a DC fault in the hybrid HVDC transmission system and resuming of power transmission after a sending-end AC system is faulty, but does not analyze the overvoltage generated by the receiving-end converters after the short-circuit fault in the receiving-end AC system. In the literature [Zhao Jianning, Chen Bing, Pan Chao et al. Ultra High-Voltage Multi-Terminal Hybrid Flexible DC Transmission Engineering Technology [M]. Beijing: Mechanical Industry Press, 2021], for a severe fault in the receiving-end AC system, it is necessary to rely on a communication system to reduce output power at a rectifier side and an overvoltage on a receiving-end MMC by increasing the firing angle of the LCC on the rectifier side. However, due to a communication delay of tens of milliseconds in long-distance transmission, it is difficult for the sending end to make a quick response in a short period of time, which may still cause a receiving-end temporary power surplus, causing the overvoltage to the receiving-end converters.

SUMMARY

In view of the above description, the present disclosure provides a control method for suppressing an overvoltage under a fault at a receiving-end AC system of an HVDC transmission system. Because a hybrid MMC is capable of actively decreasing a DC voltage for operation, on a premise of ensuring that an output current of a receiving-end MMC is always within a rated current range, a control manner of setting a reference value of the DC voltage not greater than an effective value of an AC voltage enables receiving-end power to be sent out, thereby suppressing an overvoltage for receiving-end converters.

A control method for suppressing an overvoltage under a fault at a receiving-end AC system of an HVDC transmission system is provided, where an LCC is used as a sending-end converter of the hybrid HVDC transmission system, a hybrid MMC with FBSMs and HBSMs is used as the receiving-end converter, and the control method includes following steps:

(1) during steady-state operation, using constant DC current control for the sending-end LCC, and using constant DC voltage control for a receiving-end F/HMMC;

(2) after a short-circuit fault occurs in the receiving-end AC system, generating a voltage drop for a receiving-end AC bus, and measuring an effective voltage $U_s$ of the receiving-end AC bus at the current time;

(3) switching an operation mode of the receiving-end F/HMMC to a DC voltage step-down operation mode, while still using the constant DC current control for the sending-end LCC and ensuring that an output current of the receiving-end F/HMMC is within a rated current range; and (4) determining a DC voltage reference value $U_{dcref}$ of the receiving-end F/HMMC, such that the $U_{dcref}$ is always not greater than the effective voltage $U_s$ of the receiving-end AC bus, and using the $U_{dcref}$ to control the receiving-end F/HMMC.

Further, in the step (1), a voltage of a bridge arm of the receiving-end F/HMMC during the steady-state operation meets following relationship expressions:

$$\frac{1}{2}(u_{pj} + u_{nj}) = \frac{U_{dc}}{2}, \frac{1}{2}(u_{nj} - u_{pj}) = u_{vj};$$

$$u_{pj} = \frac{U_{dc}}{2} - u_{vj}, u_{nj} = \frac{U_{dc}}{2} + u_{vj};$$

where $u_{pj}$ represents a voltage of an upper bridge arm of a phase j of the receiving-end F/HMMC, $u_{nj}$ represents a voltage of a lower bridge arm of the phase j of the receiving-end F/HMMC, $U_{dc}$ represents a DC voltage of the receiving-end F/HMMC, $u_{vj}$ represents an output AC voltage of the phase j of the receiving-end F/HMMC, and j=a, b, or c.

In the step (2), after the short-circuit fault occurs in the receiving-end AC system, the AC voltage drop occurs, reducing received AC power. Because the sending-end LCC uses the constant DC current control, a DC current is limited, and DC power linearly decreases with a DC voltage, allowing the power to be sent out. Therefore, the effective voltage $U_s$ of the receiving-end AC bus is measured as a known quantity necessary for subsequent control.

Further, in the step (3), when the operation mode of the receiving-end F/HMMC is switched to the DC voltage step-down operation mode, it is required to ensure that an operating range of a DC voltage of the receiving-end F/HMMC meets the following relationship expression:

$$M_{ac} - 2K_{FB} \leq M_{dc} \leq 2 - M_{ac}$$

where $M_{dc}$ represents a DC voltage modulation ratio of the receiving-end F/HMMC, $M_{ac}$ represents an AC voltage modulation ratio of the receiving-end F/HMMC, and $K_{FB}$ represents a proportion of the FBSMs in a single bridge arm.

Further, expressions for the DC voltage modulation ratio $M_{dc}$ and the AC voltage modulation ratio $M_{ac}$ of the receiving-end F/HMMC are as follows:

$$M_{ac} = \frac{2U_m}{U_{dcn}}, M_{dc} = \frac{U_{dc}}{U_{dcn}};$$

where $U_{dc}$ represents the DC voltage of the receiving-end F/HMMC, $U_{dc}$ represents a rated DC voltage of the receiving-end F/HMMC, and $U_m$ represents an amplitude of a valve-side phase voltage of the receiving-end F/HMMC.

Further, in the step (3), when the operation mode of the receiving-end F/HMMC is switched to the DC voltage step-down operation mode, it is required to ensure that the voltage range of a bridge arm of the receiving-end F/HMMC meets the following relationship expression:

$$\begin{cases} -N_{FB}U_{cn} \leq u_{pj} \leq N_{total}U_{cn} \\ -N_{FB}U_{cn} \leq u_{nj} \leq N_{total}U_{cn} \end{cases}$$

where $u_{pj}$ represents a voltage of an upper bridge arm of a phase j of the receiving-end F/HMMC, $U_{nj}$ represents a voltage of a lower bridge arm of the phase j of the receiving-end F/HMMC, j=a, b, or c, $N_{FB}$ represents the number of FBSMs in a single bridge arm, $N_{total}$ represents the total number of submodules in the single bridge arm, $U_{cn}$ represents a rated voltage of a submodule capacitor and $U_{cn}=U_{dcn}/N_{total}$, and $U_{dcn}$ represents a rated DC voltage of the receiving-end F/HMMC.

Further, in the step (4), after the short-circuit fault occurs in the receiving-end AC system, the effective voltage $U_s$ of the receiving-end AC bus drops within a range of 0 pu to 1 pu; and in this case, the DC voltage reference value $U_{dcref}$ is set to always be less than the $U_s$, and a difference between the $U_{dcref}$ and the $U_s$ is taken as 0.1 pu to ensure that power is capable of being sent out and the system is not overloaded, thus suppressing an overvoltage for receiving-end submodule capacitors.

After a fault occurs at the receiving end AC system of the hybrid HVDC transmission system, the present disclosure first measures the effective voltage of the receiving-end AC bus. Based on a capability that the receiving-end F/HMMC actively decreases the DC voltage for operation, the DC voltage reference value is set and ensured to be not greater than the effective voltage of the receiving-end AC bus. Meanwhile, the sending-end LCC uses the constant DC current control, which ensures that an output current of the receiving-end F/HMMC is always within the rated current range, and power absorbed at a receiving end linearly decreases with the DC voltage. The control method in the present disclosure actively decreases a receiving-end DC voltage, reduces receiving-end energy absorption, and avoids a power surplus at a receiving-end system, thereby suppressing the overvoltage for the receiving-end submodule capacitors, improving operational reliability of the system, and being suitable for a long-distance and large-capacity flexible HVDC transmission scenario.

According to the control method in the present disclosure, the hybrid HVDC transmission system can still transmit a certain amount of power, and even if the most severe three-phase-to-ground short-circuit fault occurs in the receiving-end AC system, and the voltage of the receiving-end AC bus drops to 0, power transmission can be blocked by setting the reference DC voltage of F/HMMC to 0. After the fault is removed, the hybrid HVDC transmission system can smoothly recover the power transmission.

Compared with the prior art, the present disclosure has following beneficial technical effects:

1. According to the method in the present disclosure, there is no need for communication with the sending-end converter or to change a control mode of the sending-end converter, which is simple and achieves a fast response.

2. The method in the present disclosure not only suppresses the overvoltage of the receiving-end F/HMMC, but also ensures that the hybrid DC transmission system can still transmit a certain amount of power during the fault, thereby improving reliability of the hybrid DC transmission system.

DETAILED DESCRIPTION OF THE EMBODIMENTS

Figure 1:
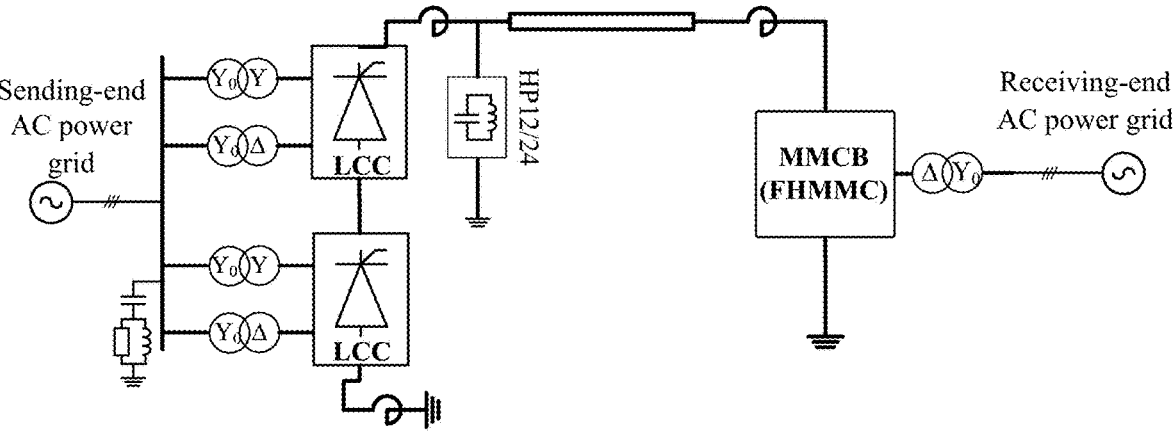
FIG. 1 is the diagram of the hybrid HVDC transmission system topology.
Figure 2:
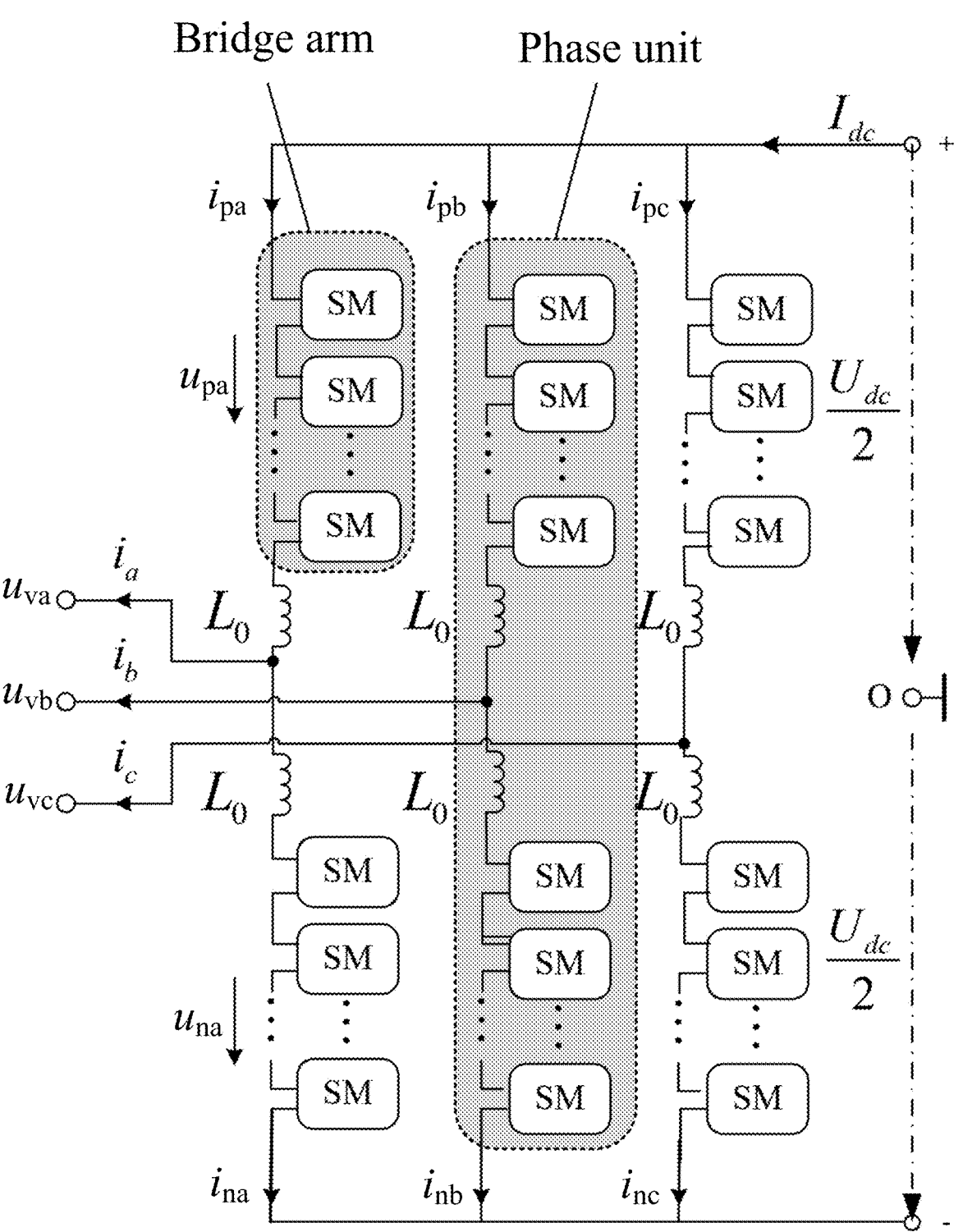
FIG. 2 is the diagram of the MMC topology.

In order to more specifically describe the present disclosure, the technical solution of the present disclosure is described in detail below with reference to the accompanying drawings and specific implementations.

The hybrid HVDC transmission system in this implementation is an LCC-F/HMMC hybrid HVDC transmission system, where an LCC is used at the sending end, and the F/HMMC with FBSMs and HBSMs is used at the receiving end. After a short-circuit fault occurs in a receiving-end AC system, transmission of receiving-end power is blocked. A controller is designed to suppress an overvoltage of the receiving-end F/HMMC. The specific control method includes following steps:

(1) During steady-state operation, the LCC on a rectifier side uses the constant DC current control, and F/HMMC on an inverter side uses the constant DC voltage control.

The voltage of the bridge arm of F/HMMC during the steady-state operation always meets following relationship expressions (j=a,b,c):

$$\frac{1}{2}(u_{pj}+u_{nj})=\frac{U_{dc}}{2};\ \frac{1}{2}(u_{nj}-u_{pj})=u_{vj};$$

In the above relationship expressions, $U_{pj}$ represents the voltage of an upper bridge arm, $U_{nj}$ represents the voltage of a lower bridge arm, $U_{dc}$ represents the DC voltage, and $u_{vj}$ represents the output AC voltage. The above two relationship expressions are added and subtracted to respectively obtain expressions for the voltages of the upper and lower bridge arms:

$$u_{pj}=\frac{U_{dc}}{2}-u_{vj};$$

and $$u_{nj}=\frac{U_{dc}}{2}+u_{vj}.$$

(2) After the short-circuit fault occurs in the receiving-end AC system, and generates an AC voltage drop at the receiving end, the effective voltage of the receiving-end AC bus $U_s$ is measured at the current time.

After a short-circuit fault occurs in a receiving-end AC system, the voltage drop is generated for the receiving-end AC bus, reducing received power. Because the sending-end LCC uses the constant DC current control, the DC current is limited, and the DC power linearly decreases with the DC voltage, allowing power to be sent out. Therefore, $U_s$ can be measured as a known quantity necessary for subsequent F/HMMC control.

(3) Switch the F/HMMC on the inverter side to a DC voltage step-down operation mode, while the LCC on the rectifier side still uses the constant DC control to ensure that the output current of the receiving-end F/HMMC is within a rated current range.

When the F/HMMC switches to the DC voltage step-down operation mode, an operating range of a DC voltage of the F/HMMC can be calculated according to following formulas:

Expressions for known valve-side three-phase voltages are as follows:

$$\begin{cases} u_{va}=U_m\cos\omega t \\ u_{vb}=U_m\cos\left(\omega t-\frac{2\pi}{3}\right) \\ u_{vc}=U_m\cos\left(\omega t+\frac{2\pi}{3}\right) \end{cases}$$

In the above expressions, $U_m$ represents the amplitude of a valve-side phase voltage, and ω represents the angular velocity at the nominal frequency.

$M_{ac}$ is defined as an AC-side voltage modulation ratio of the F/HMMC, which meets a following expression:

$$M_{ac}=\frac{2U_m}{U_{dcn}},$$

where $U_{dcn}$ represents the rated DC voltage of the hybrid MMC.

$U_{cn}$ represents the rated voltage of submodule capacitors, which meets a following expression:

$$U_{cn} = \frac{U_{dcn}}{N_{total}}.$$

In the above expression, $N_{total}$ represents the number of submodules of each bridge arm.

A DC voltage modulation ratio $M_{dc}$ is defined, which is expressed as follows:

$$M_{dc} = \frac{U_{dc}}{U_{dcn}}.$$

The above expression is substituted into the expressions derived for the voltages of the upper and lower bridge arms under a steady-state operation condition. A phase a is taken as an example, and it can be concluded that voltages of upper and lower bridge arms of phase a need to meet the following expressions:

$$u_{pa} = \frac{(M_{dc} - M_{ac} \cos \omega t)N_{total}U_{cn}}{2};$$

and $$u_{na} = \frac{(M_{dc} + M_{ac} \cos \omega t)N_{total}U_{cn}}{2}.$$

For the F/HMMC, a voltage range that each bridge arm can output is expressed as follows:

$$\begin{cases} -N_{FB}U_{cn} \le u_{pa} \le N_{total}U_{cn} \\ -N_{FB}U_{cn} \le u_{na} \le N_{total}U_{cn} \end{cases}.$$

An operating range of the DC voltage of F/HMMC can be finally obtained, which meets the following expression:

$$M_{ac} - 2K_{FB} \le M_{dc} \le 2 - M_{ac}.$$

In practical engineering, the AC modulation ratio $M_{ac}$ of an MMC is usually around 0.85. When a proportionality coefficient $K_{FB}$ of the FBSM is 0.5, which means that the FBSM accounts for half of all submodules, the operating range of the DC voltage of the hybrid MMC is $[-0.15 \, U_{den}, 1.15 \, U_{den}]$. Therefore, it can be seen that the DC voltage of the hybrid MMC has a large operating range, which meets the requirement of decreasing the DC voltage for operation in practical engineering.

(4) Determine the DC voltage reference value $U_{dcref}$, such that $U_{dcref}$ is always not greater than the effective voltage of the receiving-end AC bus $U_s$.

After the short-circuit fault occurs in the receiving-end AC system, $U_s$ drops within a range of 0 pu to 1 pu. In this case, $U_{dcref}$ (in units of pu) is set to always not greater than $U_s$, for example, to be less than the $U_s$ by one difference, and is usually taken as 0.1 pu. In this way, power can be sent out, and the system is never overloaded, thus suppressing the overvoltage of the receiving-end F/HMMC. According to such control method, the hybrid HVDC transmission system can still transmit a certain amount of power. Even if the most severe three-phase-to-ground short-circuit fault occurs in a receiving-end AC system, i.e., the voltage of the receiving-end AC bus drops to 0, power transmission can be blocked by setting the reference DC voltage of the receiving-end F/HMMC to 0. After the fault is removed, the hybrid HVDC transmission system can smoothly recover the power transmission.

Figure 3:
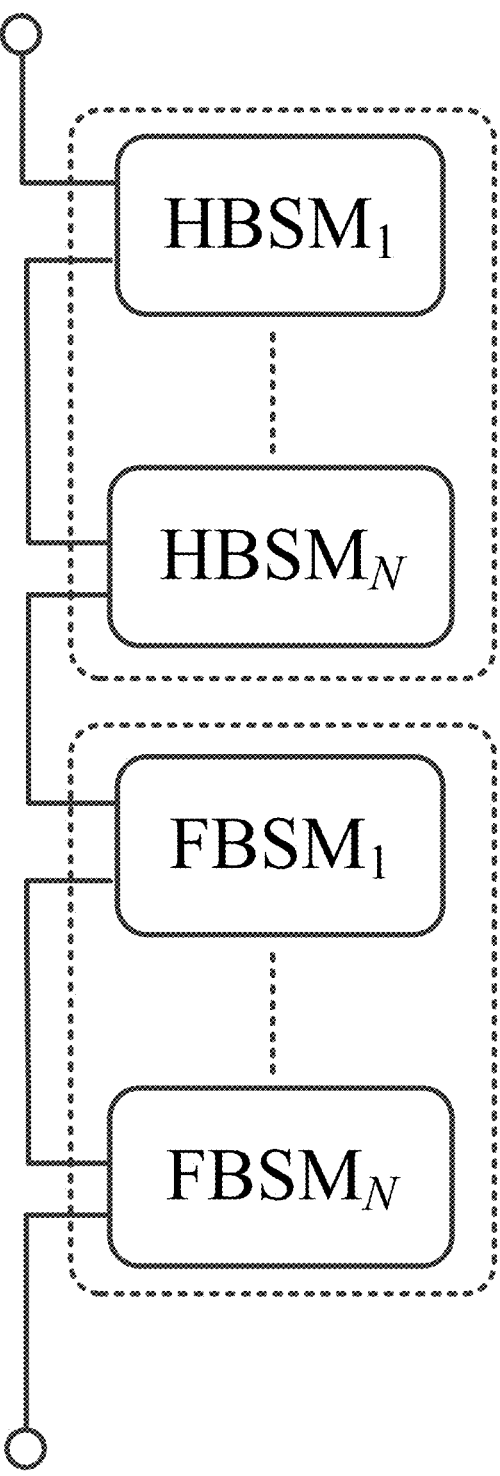
FIG. 3 is the diagram of a bridge arm of the F/HMMC.
Figure 4:
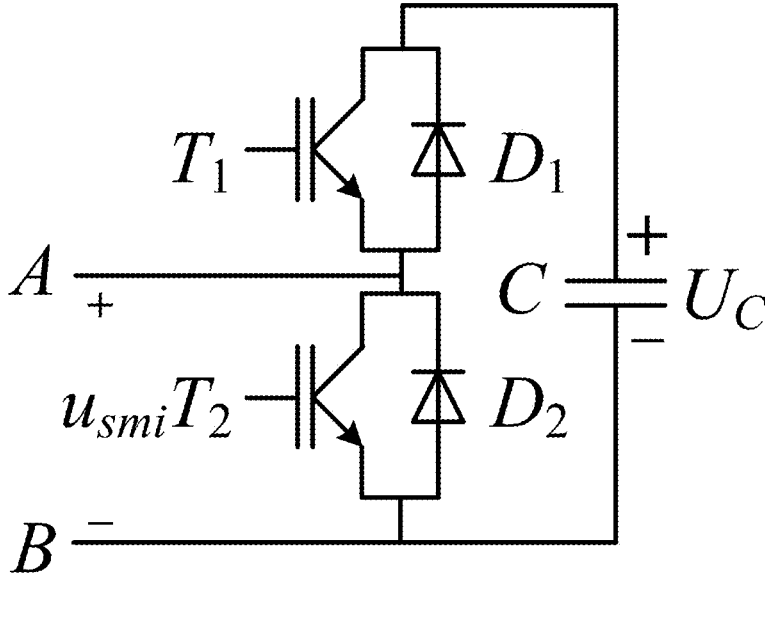
FIG. 4 is the diagram of the HBSM topology.
Figure 5:
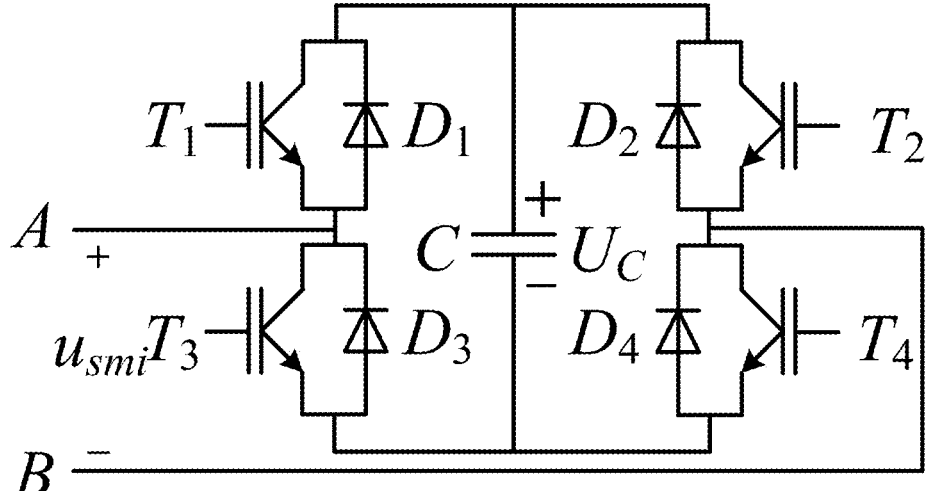
FIG. 5 is the diagram of the FBSM topology.

As shown in FIG. 1, the rectifier station of the hybrid HVDC transmission system in this implementation includes a 12-pulse LCC, a converter transformer with Y0/Y and Y0/Δ connection modes, a filter, and a reactive power compensator. The inverter station includes the hybrid MMC with the FBSMs and the HBSMs (namely, the F/HMMC whose topology is shown in FIG. 3, and structures of the bridge arm and the submodule are shown in FIG. 3 to FIG. 5), and a converter transformer with the Y0/Δ connection mode. DC outlet sides of the rectifier station and the inverter station each are connected to a smoothing reactor in series, to prevent a converter device from being damaged by preventing lightning and other steep shock waves from a DC line from entering the converter station, and suppress a sudden increase in a DC fault current.

Figure 6:
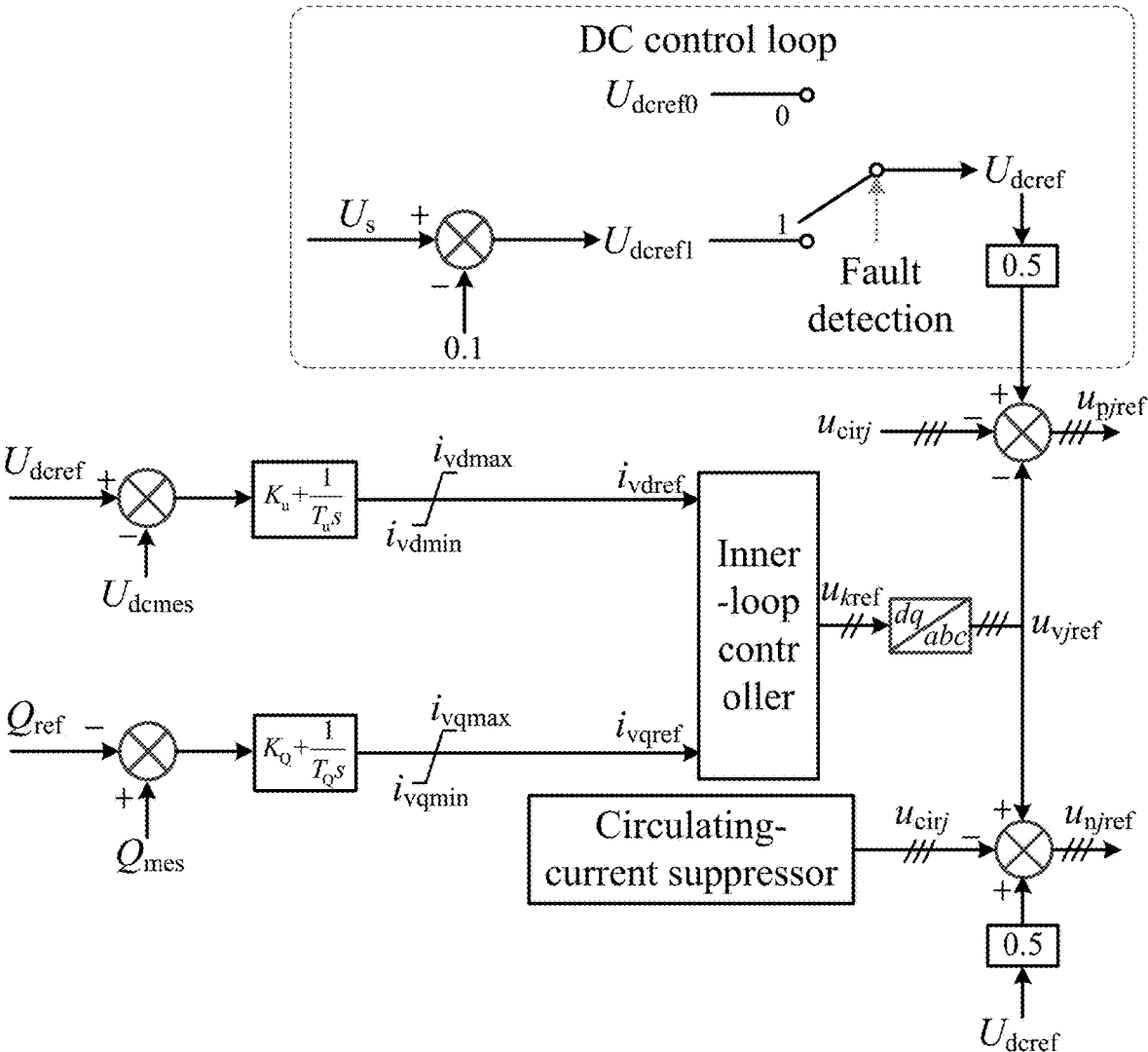
FIG. 6 is the diagram of the control strategy of the receiving-end F/HMMC.

The control strategy of the receiving-end F/HMMC in the hybrid HVDC transmission system is shown in FIG. 6. After a fault occurs at the receiving-end AC system, the DC voltage reference value $U_{dcref}$ is changed to achieve control.

Based on FIG. 1, the parameters of the hybrid HVDC transmission system in the example using the control strategy of the present disclosure are shown in Table 1:

TABLE 1

| | Parameter | Value |
|---|---|---|
| Basic parameters of the system | Rated capacity/MW | 2500 |
| | Rated DC voltage/kV | 800 |
| | Rated DC current/kA | 3.125 |
| | Effective AC voltage/kV | 525 |
| | Short-circuit ratio of the AC system | 6 |
| | Inductance of the smoothing reactor/mH | 300 |
| MMC parameters | Rated capacity/MW | 1250 |
| | Number of HBSMs per bridge arm | 100 |
| | Number of FBSMs per bridge arm | 100 |
| | Submodule capacitance/μF | 21 |
| | Inductance of a bridge arm/mH | 24.3 |
| Parameters of the transformers of the LCC | Winding type | Y0/Y, Y0/Δ |
| | No-load voltage ratio/kV | 525/180 |
| | Capacity/MVA | 1500 |
| | Leakage reactance/p.u. | 0.2 |
| Parameters of the transformers of the F/HMMC | Winding type | Y0/Δ |
| | No-load voltage ratio/kV | 525/210 |
| | Capacity/MVA | 1500 |
| | Leakage reactance/p.u. | 0.15 |
| Parameters of the DC line | Line length/km | 1200 |
| | Resistance per unit length/$\Omega \cdot km^{-1}$ | $3.05 \times 10^{-3}$ |
| | Inductance per unit length/$mH \cdot km^{-1}$ | 0.717 |
| | Capacitance per unit length/$\mu F \cdot km^{-1}$ | $6.19 \times 10^{-3}$ |

The following verifies the effectiveness of the control strategy of the present disclosure by simulating a three-phase short-circuit fault in the receiving-end AC system.

It is assumed that at t=0.1 s, a near-end three-phase system fault occurs in the receiving-end AC system, and lasts 0.1 s. It can be seen from FIG. 7 that the effective voltage $U_s$ of the receiving-end AC bus drops to 0.2 pu. After the fault occurs, the F/HMMC switches to the DC voltage step-down operation mode, and the DC voltage reference value $U_{dcref0}$ at this time is switched from the initial value $U_{dcref0}$ to $U_{dcref1}$ (namely, $U_s$-0.1).

FIG. 6 shows the basic structure of the control of the converter station. In the figure, a subscript ref represents the reference value, a subscript mes represents the measured value, $K_u$ and $K_Q$ respectively represent a proportionality coefficient and an integral time constant for control based on the constant voltage control, and $T_u$ and $T_Q$ respectively represent a proportionality coefficient and an integral time constant for control based on constant reactive power control. The reference d-axis current value $i_{dref}$ is output by the constant voltage control, and the reference q-axis current value $i_{qref}$ is output by the constant reactive power control. In the inner-loop controller, the voltage reference signal $u_{kref}$ (k=d, q) is output. According to following expressions, the voltages of the upper and lower bridge arms of the receiving-end F/HMMC can be obtained to determine whether the overvoltage occurs.

$$u_{pj} = \frac{U_{dc}}{2} - u_{vj};$$

and $$u_{nj} = \frac{U_{dc}}{2} + u_{vj}.$$

Figure 7:
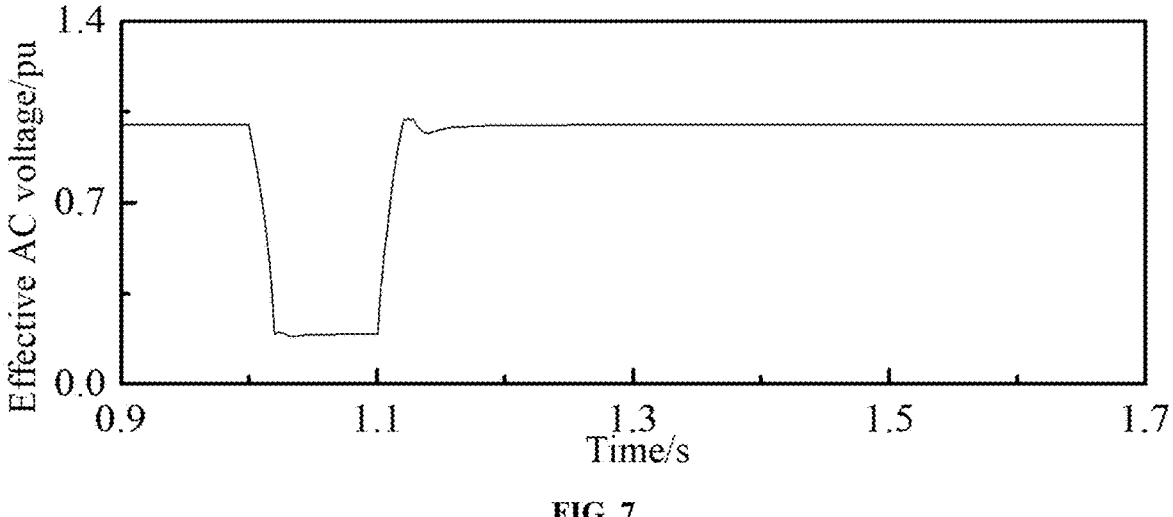
FIG. 7 shows the diagram of the receiving-end effective AC voltage after a short-circuit AC fault occurs in the receiving end.
Figure 8:
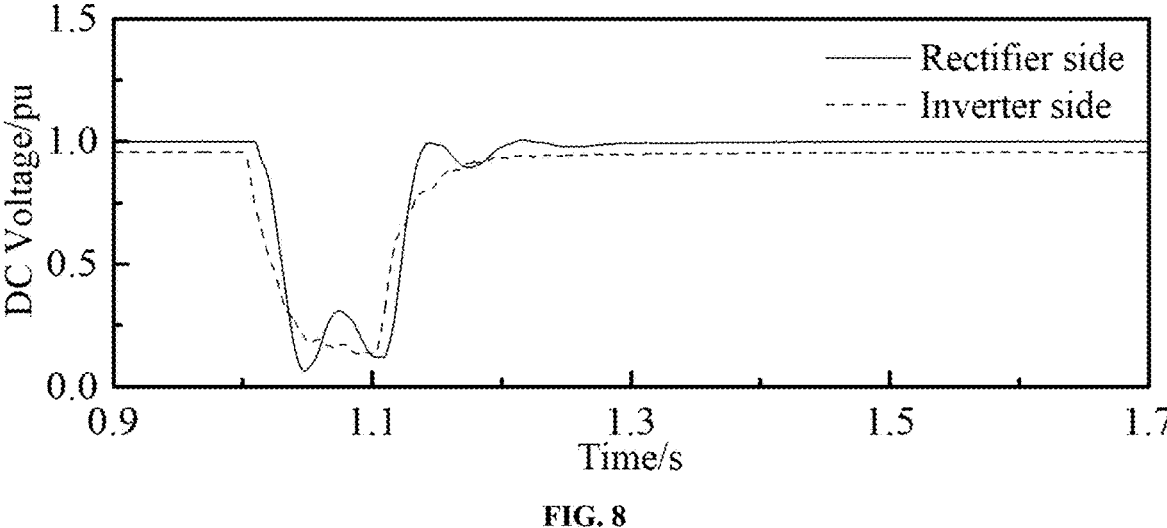
FIG. 8 shows the diagrams of DC voltages on the rectifier and inverter sides of the hybrid HVDC transmission system when the control strategy of the present disclosure is adopted after a short-circuit AC fault occurs at the receiving end.
Figure 9:
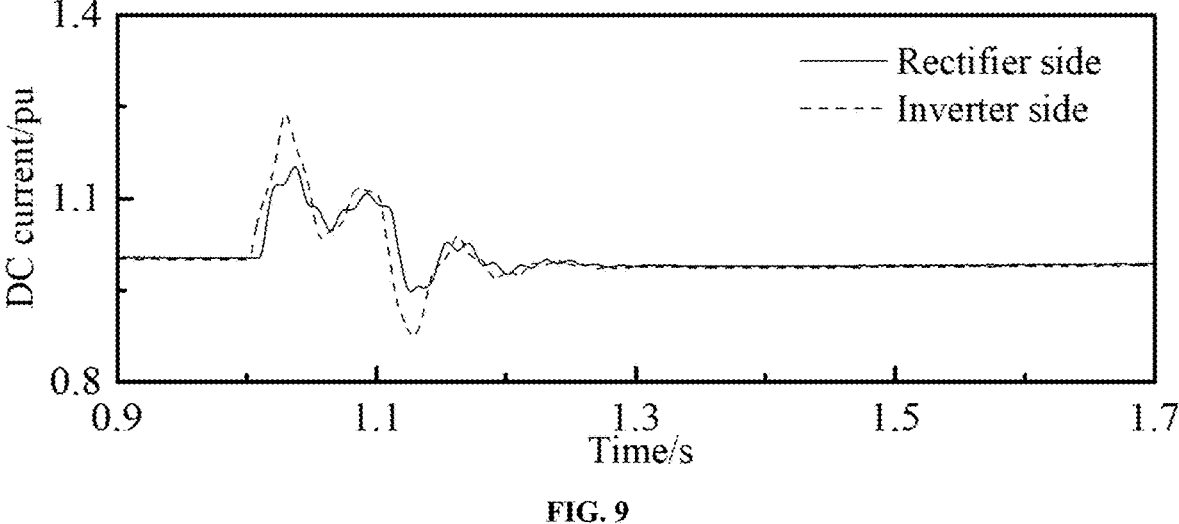
FIG. 9 shows the diagrams of DC currents on the rectifier and inverter sides of the hybrid HVDC transmission system when the control strategy of the present disclosure is adopted after a short-circuit AC fault occurs at the receiving end.
Figure 10:
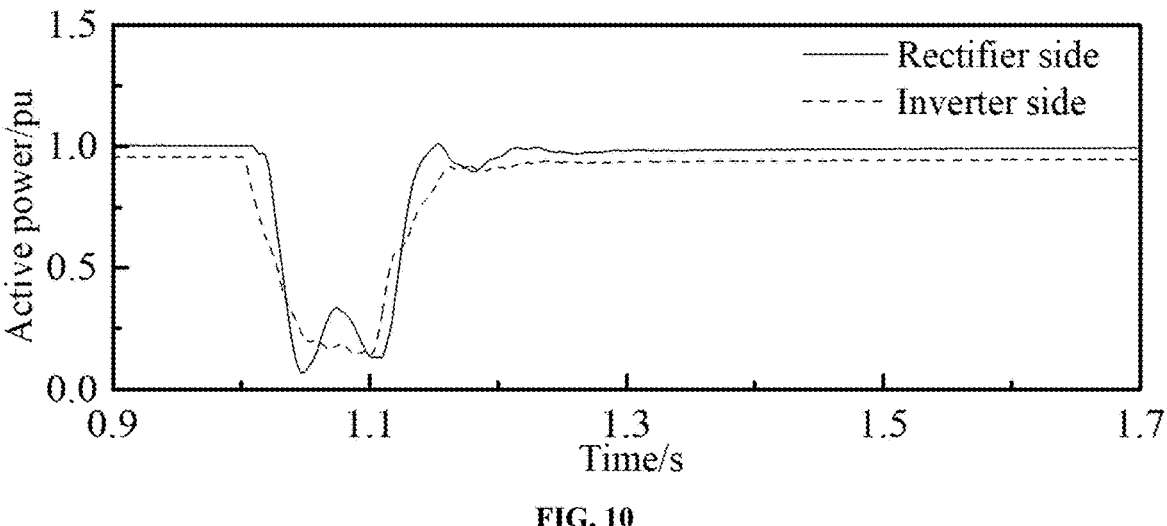
FIG. 10 shows the diagrams of DC power on the rectifier and inverter sides of the hybrid HVDC transmission system when the control strategy of the present disclosure is adopted after a short-circuit AC fault occurs at the receiving end.
Figure 11:
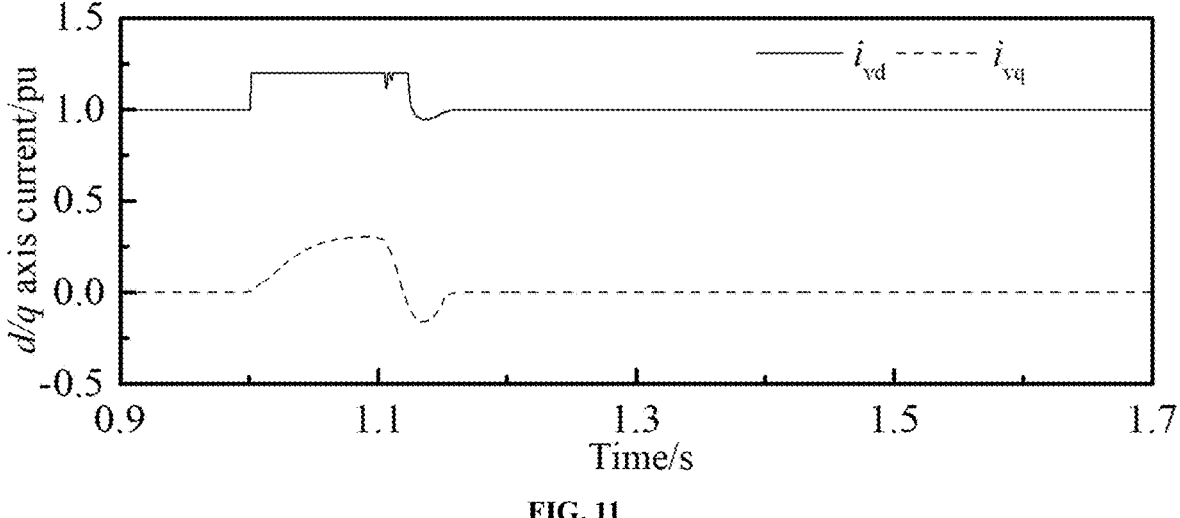
FIG. 11 shows the dq-axis components of the output current of the receiving-end F/HMMC of the hybrid HVDC transmission system when the control strategy of the present disclosure is adopted after a short-circuit AC fault occurs at the receiving end.
Figure 12:
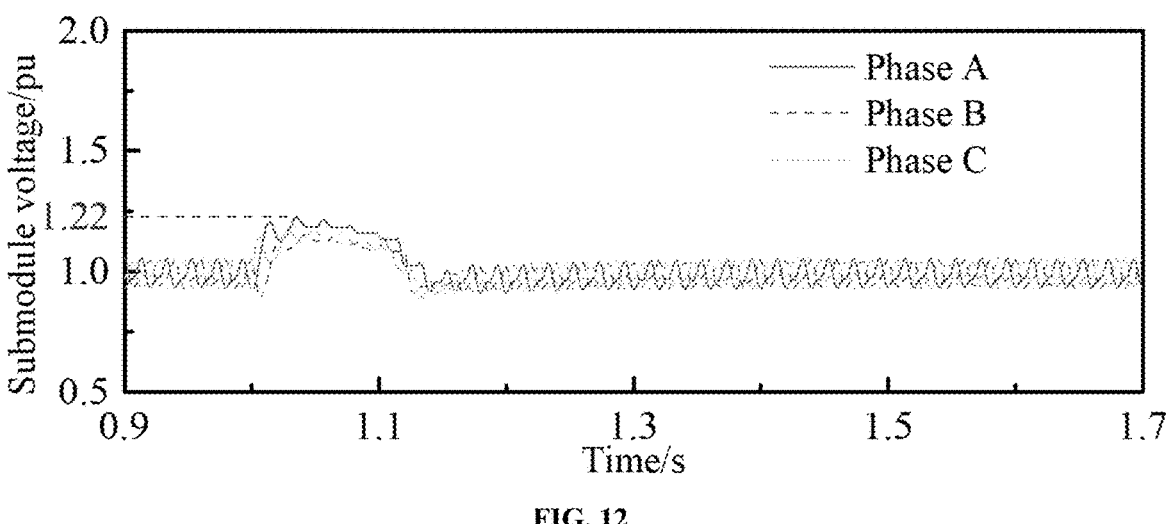
FIG. 12 shows the diagrams of the submodule capacitors' voltage of the receiving-end F/HMMC of a hybrid HVDC transmission system when the control strategy of the present disclosure is adopted after a short-circuit AC fault occurs at the receiving end.

The results of this example are shown in FIG. 7 to FIG. 12. FIG. 7 shows the effective voltage of the receiving-end AC bus. FIG. 8 shows the response curves of DC voltages on the rectifier side and the inverter side. FIG. 9 shows the response curves of DCs on the rectifier side and the inverter side. FIG. 11 shows d-axis and q-axis components of the output current of the receiving-end F/HMMC. From the above figures, it can be seen that after the three-phase short-circuit fault occurs in the receiving-end AC system, the AC voltage drops to 0.2 pu, and the DC voltage reference value of the receiving-end MMC is switched to the $U_{dcref1}$ (namely, $U_s$-0.1). Because the LCC on the rectifier side uses the constant DC current control, the DC current is limited to ensure that the output current of the receiving-end MMC is within the rated current range. Therefore, a change in the DC power is in direct proportion to a change in the DC voltage. FIG. 10 shows response curves of DC power on the rectifier side and the inverter side. The receiving-end F/HMMC actively decreases the DC voltage, reduces energy absorption, and ensures that the hybrid HVDC transmission system can transmit a certain amount of active power. FIG. 12 shows the submodule capacitors' voltage of the receiving-end F/HMMC. It can be seen from the figure that no overvoltage is generated after the fault occurs, which verifies that the control method in the present disclosure can suppress the overvoltage of the receiving-end F/HMMC.

The above description of the example is intended to facilitate a person of ordinary skill in the art to understand and use the present disclosure. Obviously, a person skilled in the art can easily make various modifications to these embodiments, and apply a general principle described herein to other embodiments without creative efforts. Therefore, the present disclosure is not limited to the embodiments herein. All improvements and modifications made by a person skilled in the art according to the disclosure of the present disclosure should fall within the protection scope of the present disclosure.

What is claimed is:

1. A control method for suppressing an overvoltage under a fault at a receiving-end alternating-current (AC) system of a hybrid high-voltage direct-current (HVDC) transmission system, wherein a line commuted converter (LCC) is used as a sending-end converter of the hybrid HVDC transmission system, a hybrid modular multilevel converter (F/HMMC) with full-bridge submodules (FBSM) and half-bridge submodules (HBSMs) is used as a receiving-end converter, and the control method comprises following steps:

(1) during steady-state operation, using constant DC current control for the LCC, and using constant DC voltage control for the F/HMMC;

(2) after a short-circuit fault occurs in the receiving-end AC system, generating a voltage drop for a receiving-end AC bus, and measuring an effective voltage $U_s$ of the receiving-end AC bus at the current time;

(3) switching an operation mode of the F/HMMC to a DC voltage step-down operation mode, while still using the constant DC current control for the LCC and ensuring that an output current of the F/HMMC is within a rated current range; and (4) determining a DC voltage reference value $U_{dcref}$ of the F/HMMC, such that the $U_{dcref}$ is always not greater than the effective voltage $U_s$ of the receiving-end AC bus, and using the $U_{dcref}$ to control the F/HMMC.

2. The control method according to claim 1, wherein in the step (1), a voltage of a bridge arm of the F/HMMC during the steady-state operation meets the following relationship expressions:

$$\frac{1}{2}(u_{pj} + u_{nj}) = \frac{U_{dc}}{2}, \frac{1}{2}(u_{nj} - u_{pj}) = u_{vj};$$

$$u_{pj} = \frac{U_{dc}}{2} - u_{vj}, u_{nj} = \frac{U_{dc}}{2} + u_{vj};$$

wherein $u_{pj}$ represents a voltage of an upper bridge arm of a phase j of the F/HMMC, $u_{nj}$ represents a voltage of a lower bridge arm of the phase j of the F/HMMC, $U_{dc}$ represents a DC voltage of the F/HMMC, $u_{vj}$ represents an output AC voltage of the phase j of the F/HMMC, and j=a, b, or c.

3. The control method according to claim 1, wherein in the step (3), when the operation mode of the F/HMMC is switched to the DC voltage step-down operation mode, it is required to ensure that an operating range of a DC voltage of the F/HMMC meets the following relationship expression:

$$M_{ac} - 2K_{FB} \le M_{dc} \le 2 - M_{ac}$$

wherein $M_{dc}$ represents a DC voltage modulation ratio of the F/HMMC, $M_{ac}$ represents an AC voltage modulation ratio of the F/HMMC, and $K_{FB}$ represents a proportion of the FBSMs in a bridge arm.

4. The control method according to claim 3, wherein expressions for the DC voltage modulation ratio $M_{dc}$ and the AC voltage modulation ratio $M_{ac}$ of the F/HMMC are as follows:

$$M_{ac} = \frac{2U_m}{U_{dcn}}, M_{dc} = \frac{U_{dc}}{U_{dcn}};$$

wherein $U_{dc}$ represents the DC voltage of the F/HMMC, $U_{dcn}$ represents a rated DC voltage of the F/HMMC, and $U_m$ represents an amplitude of a valve-side phase voltage of the F/HMMC.

5. The control method according to claim 1, wherein in the step (3), when the operation mode of the F/HMMC is switched to the DC voltage step-down operation mode, it is required to ensure that a voltage range of a bridge arm of the F/HMMC meets the following relationship expression:

$$\begin{cases} -N_{FB}U_{cn} \le u_{pj} \le N_{total}U_{cn} \\ -N_{FB}U_{cn} \le u_{nj} \le N_{total}U_{cn} \end{cases}$$

wherein $u_{pj}$ represents a voltage of an upper bridge arm of a phase j of the F/HMMC, $u_{nj}$ represents a voltage of a lower bridge arm of the phase j of the F/HMMC, j=a, b, or c, $N_{FB}$ represents the number of FBSMs in a single bridge arm, $N_{total}$ represents a total number of submodules in the single bridge arm, $U_{cn}$ represents a rated voltage of a submodule capacitor and $U_{cn}=U_{dcn}/N_{total}$, and $U_{dcn}$ represents a rated DC voltage of the F/HMMC.

6. The control method according to claim 1, wherein in the step (4), after the short-circuit fault occurs in the receiving-end AC system, the effective voltage $U_s$ of the receiving-end AC bus drops within a range of 0 pu to 1 pu; and in this case, the DC voltage reference value $U_{dcref}$ of the F/HMMC is set to always be less than the $U_s$, and a difference between the $U_{dcref}$ and the $U_s$ is taken as 0.1 pu to ensure that power is capable of being sent out and the system is not overloaded, thus suppressing an overvoltage for the F/HMMC.

7. The control method according to claim 1, wherein after a fault occurs at the receiving-end AC system of the hybrid HVDC transmission system, the effective voltage of the receiving-end AC bus $U_s$ is first measured, and based on an capability that the F/HMMC actively decreases a DC voltage for operation, a control manner in which the DC voltage reference value is set and ensured to be not greater than the effective voltage of the receiving-end AC bus, and the LCC uses the constant DC current control, which ensures that an output current of the F/HMMC is always within the rated current range and power absorbed at a receiving end can linearly decrease with the DC voltage.

8. The control method according to claim 1, wherein the control method actively decreases a receiving-end DC voltage, reduces receiving-end energy absorption, and avoids a power surplus of a receiving-end system, thereby suppressing an overvoltage of the F/HMMC, improving operational reliability of the system, and being suitable for a long-distance and large-capacity flexible DC transmission scenario.

* * * * *